United States Patent
Akamatu et al.

(10) Patent No.: US 7,036,041 B2
(45) Date of Patent: Apr. 25, 2006

(54) METHOD, PROGRAM AND SYSTEM FOR MANAGING OPERATION

(75) Inventors: Yuji Akamatu, Yokohama (JP); Motoaki Hirabayashi, Yokohama (JP)

(73) Assignee: Hitachi, Ltd., Tokyo (JP)

(*) Notice: Subject to any disclaimer, the term of this patent is extended or adjusted under 35 U.S.C. 154(b) by 423 days.

(21) Appl. No.: 10/371,212

(22) Filed: Feb. 24, 2003

(65) Prior Publication Data

US 2004/0078628 A1    Apr. 22, 2004

(30) Foreign Application Priority Data

Jul. 3, 2002    (JP) .............................. 2002-194083

(51) Int. Cl.
G06F 11/00    (2006.01)

(52) U.S. Cl. ............................... 714/6; 714/16; 714/20; 707/202; 707/204

(58) Field of Classification Search .................... 714/2, 714/5, 6, 15, 19, 20, 16; 707/202, 204
See application file for complete search history.

(56) References Cited

U.S. PATENT DOCUMENTS

| | | | |
|---|---|---|---|
| 5,455,934 A | 10/1995 | Holland et al. | |
| 5,613,113 A * | 3/1997 | Goldring | 707/202 |
| 5,625,820 A * | 4/1997 | Hermsmeier et al. | 707/202 |
| 6,208,913 B1 | 3/2001 | Marshall et al. | |
| 6,272,515 B1 * | 8/2001 | Fouquet | 718/101 |
| 6,658,590 B1 * | 12/2003 | Sicola et al. | 714/6 |
| 6,678,704 B1 * | 1/2004 | Bridge et al. | 707/202 |
| 6,728,879 B1 * | 4/2004 | Atkinson | 713/168 |
| 6,757,850 B1 * | 6/2004 | Lehner | 714/48 |
| 6,820,217 B1 * | 11/2004 | Mock et al. | 714/15 |
| 6,947,956 B1 * | 9/2005 | Olstad et al. | 707/200 |
| 2003/0088319 A1 * | 5/2003 | Kanai | 700/9 |
| 2003/0177150 A1 * | 9/2003 | Fung et al. | 707/204 |
| 2003/0229819 A1 * | 12/2003 | Kodama | 714/5 |
| 2004/0205382 A1 | 10/2004 | Noda et al. | |
| 2004/0216002 A1 | 10/2004 | Fromherz et al. | |
| 2004/0225915 A1 | 11/2004 | Johnson et al. | |

FOREIGN PATENT DOCUMENTS

| | | |
|---|---|---|
| JP | 7-56793 | 3/1995 |
| JP | 2000-76110 | 3/2000 |
| JP | 2001-350637 | 12/2001 |

* cited by examiner

Primary Examiner—Scott Baderman
Assistant Examiner—Paul F. Contino
(74) Attorney, Agent, or Firm—Mattingly, Stanger, Malur & Brundidge, P.C.

(57) ABSTRACT

A system, and a method, for reorganizing an execution schedule. According to the invention, the recovery time of a storage device where a failure occurs is determined. Then, according to the recovery time, a schedule is produced for the operations that use the storage device where the failure occurred, and for the operations that do not use the storage device.

5 Claims, 11 Drawing Sheets

| OPERATIONS | START TIME | EXECUTION TIME | SKIP SETTING | LIMITER SETTING | FILE TO BE USED | STATUS |
|---|---|---|---|---|---|---|
| OPERATION A | 6:00 | 2:00 | YES | 14:00 | a,c | |
| OPERATION B | 8:30 | 1:00 | NO | NO | b,d | |
| OPERATION C | 11:00 | 2:00 | NO | 16:00 | a,b,c,e | |
| OPERATION D | 14:00 | 2:50 | YES | 17:00 | d,e | |

FIG. 12(a)

| OPERATIONS | START TIME | EXECUTION TIME | SKIP SETTING | LIMITER SETTING | FILE TO BE USED |
|---|---|---|---|---|---|
| OPERATION A | 6:00 | 2:00 | NO | 12:00 | a,c |
| OPERATION B | 8:30 | 2:00 | NO | 17:00 | b,d |
| OPERATION C | 11:00 | 2:00 | NO | 13:00 | a,b,c,e |
| OPERATION D | 14:00 | 2:00 | NO | 19:20 | d,e |

FIG. 12(b)

| OPERATIONS | START TIME | EXECUTION TIME | SKIP SETTING | LIMITER SETTING | FILE TO BE USED |
|---|---|---|---|---|---|
| OPERATION A | 6:00 | 2:00 | YES | 12:00 | a,c |
| OPERATION B | 8:30 | 2:00 | NO | 17:00 | b,d |
| OPERATION C | 11:00 | 2:00 | NO | 13:00 | a,b,c,e |
| OPERATION D | 14:00 | 2:00 | NO | 19:20 | d,e |

FIG. 12(c)

| OPERATIONS | START TIME | EXECUTION TIME | SKIP SETTING | LIMITER SETTING | FILE TO BE USED |
|---|---|---|---|---|---|
| OPERATION A | 6:00 | 2:00 | YES | 12:00 | a,c |
| OPERATION B | 9:00 | 2:20 | NO | 14:00 | d,e |
| OPERATION C | 11:30 | 2:00 | NO | 15:00 | b,d |
| OPERATION D | 14:00 | 2:00 | NO | 16:30 | a,b,c,e |

METHOD, PROGRAM AND SYSTEM FOR MANAGING OPERATION

BACKGROUND OF THE INVENTION

The present invention relates to an operations management system for managing operations.

There is a technology to execute a plurality of operations according to a schedule, wherein a plurality of jobs executed by a computer constitute one operation. In this case, a system is so devised that a computer is connected to a storage device for storing data so as to execute the operations. In the event that a failure occurs in such a technology, operations are required to recover from the failure as quickly as possible.

For example, according to the description in Japanese Patent Laid-open No. Hei 7-56793, when a failure of a file occurs, in order to recover from the failure without operator intervention, both failure recovery procedures and their job contol statements are built up for recovering from the failure, according to a file name of the failed file and a device name of a failed device. In addition, Japanese Patent Laid-open No. 2000-76110 describes the technology for automatically recovering a system in a short period of time by detecting only failed files in a distribution file system where a failure occurs to recover only the files using backup information. Further, according to the disclosure of Japanese Patent Laid-open No. 2001-350637, the scheduled end time of a job which is not yet executed is first calculated, if this scheduled end time is before the time at which the job should end, the job is added to a schedule, then the schedule is reorganized by determining an execution sequence in order of extraction according to priorities, and thereby the jobs are executed according to the reorganized schedule.

SUMMARY OF THE INVENTION

Japanese Patent Laid-open Nos. Hei 7-56793 and 2000-76110 do not disclose a technology to reorganize a schedule of operations. In addition, Japanese Patent Laid-open No. 2001-350637 relates to the technology to reorganize a job schedule in response to the restoration time when power is restored. However, a failure of a file is not disclosed.

It is therefore an object of the present invention to provide a system, and a method, for reorganizing an execution schedule of operations when a failure occurs in a storage device.

In one aspect of the present invention, files used for an operation, the end time of the operation, and importance of the operation are added to schedule data of operations management. A problematic operation is kept track of by referring to the schedule data when a failure occurs. Moreover, judging from conditions of the disk recovery time, urgency of each operation is determined to automatically reorganize the schedule.

BRIEF DESCRIPTION OF THE DRAWINGS

FIGS. 12(a), 12(b) and 12(c) are tables, each of which illustrates an example of schedule data.

DESCRIPTION OF THE PREFERRED EMBODIMENTS

Preferred embodiments of the present invention will be described with reference to drawings.

Figure 1:
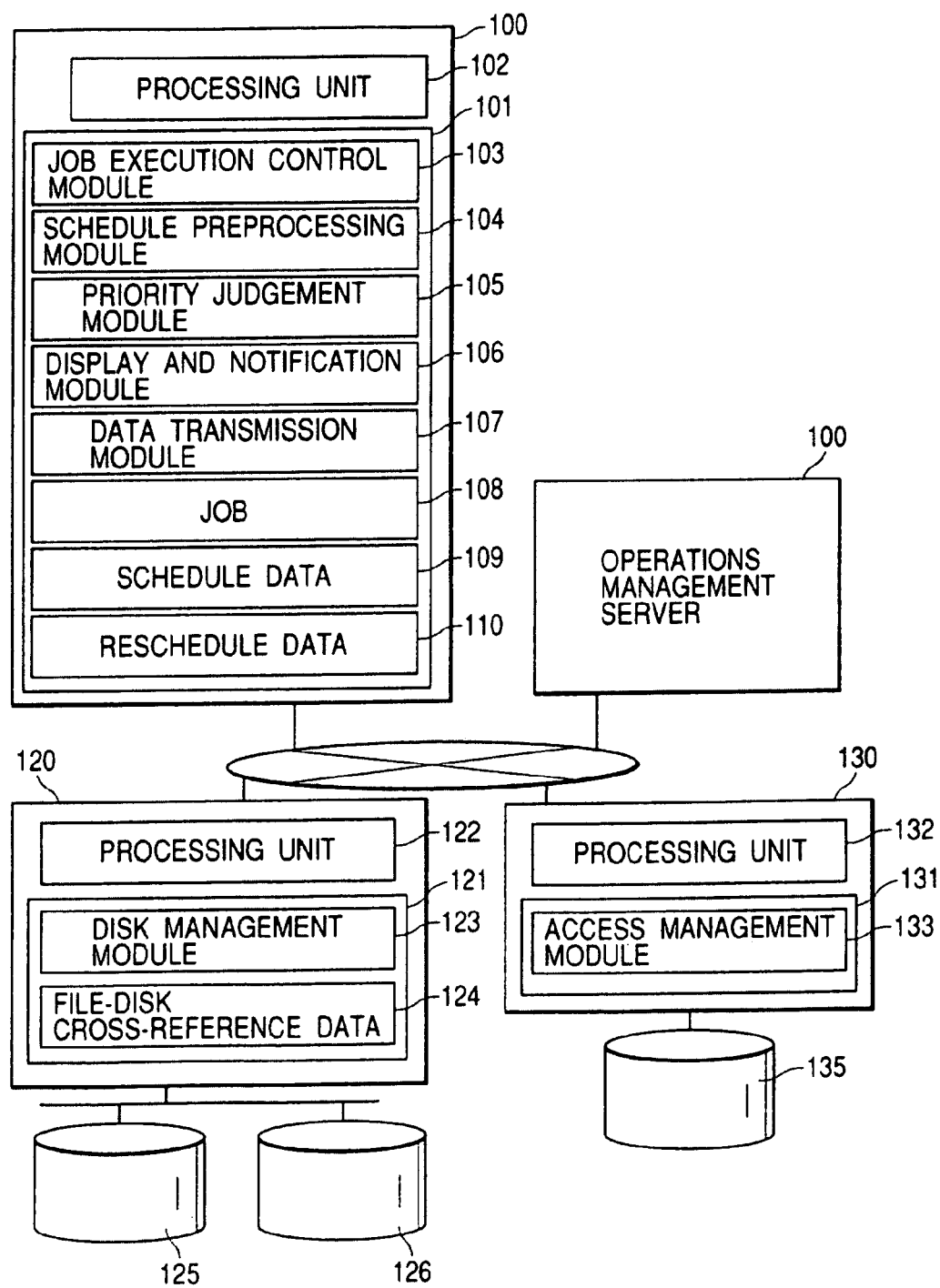
FIG. 1 is a diagram illustrating a system configuration.

FIG. 1 is a diagram illustrating a configuration of a system that executes operations. This system comprises the following: a plurality of operations management servers 100 that manage and execute operations; a plurality of disk devices 125, 126 that store data generated during executing the operations or data required for executing the operations; a disk management server 120 that controls writing/reading of data to/from the disk devices 125, 126; a storage device 135 in which data stored in the disk devices 125, 126 is stored; and a backup server 130 that controls writing/reading of data to/from the storage device 135.

Here, the storage device 135 is used for backing up data of the disk devices 125, 126. The storage device 135 may be formed of disks, and it may also be formed of tapes. The operations management server 100, the disk management server 120, and the backup server 130, which are shown in FIG. 1, comprise storage units 101, 121, 131 for storing programs and data, and processing units 102, 122, 132 such as CPU for executing the programs, respectively. Accordingly, each server may be configured as a general-purpose computer, and it may also be configured as dedicated hardware. Each server will be specifically described below.

Here, each of the operations management servers 100 has the same functions as the other operations management servers, and is also configured in the same manner. However, operations or jobs executed in each operations management server may differ from those executed in the other operations management servers.

The operations management server 100 comprises a job execution control module 103, a schedule preprocessing module 104, a priority judgment module 105, a display and notification module 106, a data transmission module 107, and a plurality of jobs to be executed. The job execution control module 103 executes jobs. The schedule preprocessing module 104 calculates a period of time taken for recovery of a failed disk and thereby determines how to execute operations which are not influenced by the failure. The priority judgment module 105 reorganizes a schedule of operations. The display and notification module 106 displays processing urgency of operations on a screen to notify a person in charge of each operation of a failure when the failure occurs. The data transmission module 107 backs up and restores data. These modules and jobs are software programs, and are stored in the storage unit 101. It is to be noted that an operation means one job 108 or a group of jobs 108. In addition, the storage unit 101 is configured to store schedule data 109 that defines a schedule followed by operations to be executed, and reschedule data 110 that has information about operations, a schedule of which will be changed when a failure occurs.

The disk management server 120 comprises a disk management module 123, and a file-disk cross-reference data 124 describing how files correspond to disk devices that store the files. The disk management module 123 has some functions. Each function will be described below. A first function is an access control function that writes and reads data to and from the disk devices 125, 126. A second function is a function of monitoring writing/reading of data to/from the disk devices 125, 126, and thereby if data cannot be written or read, judging that a failure of the disk device has occurred, and consequently reporting an identifier for identifying the failed disk device to the operations management server 100. In this case, the disk management server 120 detects the failure of the disk device, that is to say, a state in which the disk device cannot write or read data when the disk device is accessed by an access request from the operations management server 100. Accordingly, if such a failure occurs, the failure is reported to the operations management server 100 that has issued the access request. A third function is a function that stores a file name of data stored in a disk device into the file-disk cross-reference data 124 according to an access request from the operations management server 100. A fourth function is a function that transmits the file-disk cross-reference data 124 to the operations management server 100 according to a request from the operations management server 100. It is to be noted that the disk management module 123 is a software program, and is stored in the storage unit 121.

The disk devices 125, 126 that are connected to the disk management server 120 store the results of jobs executed in the operations management server 100, and data used for the jobs.

The backup server 130 comprises an access management module 133 that manages an access to the storage device 135. It is to be noted that this module is also a software program and is stored in the storage unit 131 of the backup server 130. The storage device 135 is a storage device used for backup. The storage device 135 stores data of the disk devices 125, 126 as target data to be backed up by the operations management servers 100.

Figures 2, 3:
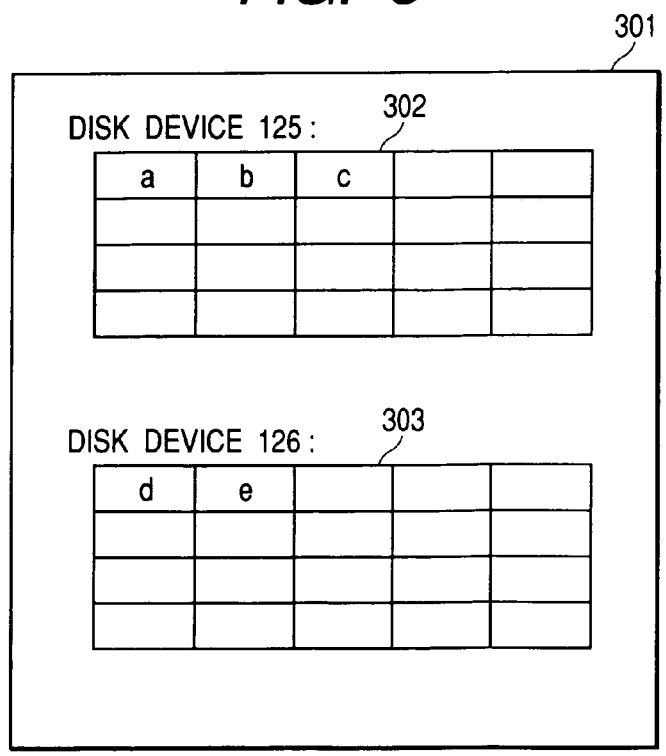
FIG. 2 is a table illustrating an example of schedule data.
FIG. 3 is a diagram illustrating an example of data as to how files correspond to disks.

FIG. 2 illustrates an example of the schedule data 109. The schedule data is provided by an administrator. The job execution control module 103 monitors the schedule data, and executes a job according to the schedule data. The schedule data 109 is information used to manage operations. The schedule data 109 includes information about how to execute the operations, and priorities of the operations at the time of a failure. More specifically, start time 202, execution time 203, skip setting 204, limiter setting 205, a file to be used 206, and a status 207 are recorded as the schedule data 109. The start time 202 means start time of an operation. The execution time 203 is a period of time taken to complete the operation. "Yes" in the skip setting 204 shows that it is not necessary to execute this operation. For example, an operation that does not cause a big problem even if the operation is executed the next day is provided with "Yes". The limiter setting 205 is a time limit within which the operation must be completed. The file to be used 206 is a file, or files, required to execute the operation. The status 207 stores a status of the operation. If the operation ends, "end" is stored; and if the operation is being executed, "being executed" is stored. If nothing is stored in the status 207, it shows a state in which the operation is not yet executed. The job execution control module 103 stores such a state in the status 207 of execution. In this connection, as described above, each operation includes one or more jobs, each of which is associated with the operation. Accordingly, if the operation is identified, the associated jobs can also be identified. The job execution control module 103 monitors the schedule data 109. When the execution time of the operation comes, the job execution control module 103 executes the job 108 identified by the operation.

The reschedule data 110 in the operations management server 100 also has information that is substantially the same as that shown in FIG. 2. To be more specific, an operation name, start time, execution time, skip setting, limiter setting, and a file to be used are recorded as the reschedule data 110. However, a status is not recorded.

FIG. 3 illustrates an example of the the file-disk cross-reference data 124. The file-disk cross-reference data 124 shows file information 302, 303 about files stored in the disk devices 125, 126 respectively. Here, the disk devices 125, 126 store one or more files each consisting of a group of data. Therefore, the file information 302, 303 refer to the file names of the files.

When a failure of a disk device is reported by the disk management server 120, the operations management server 100 shown in FIG. 1 judges whether or not an operation can be executed according to a schedule. If the operation cannot be executed according to the schedule, the operations management server 100 changes the schedule data. Processing of the operations management server 100 performed after the failure is reported will be described below.

Figure 4:
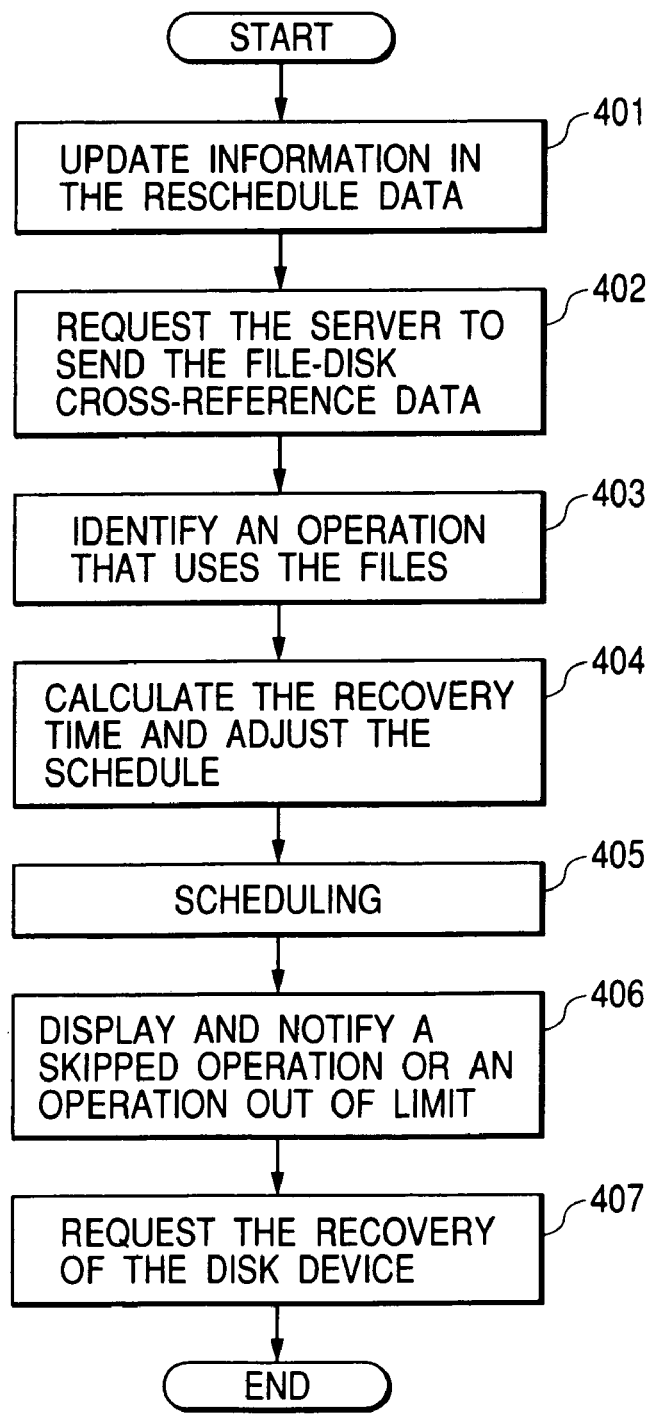
FIG. 4 is a flowchart illustrating processing of scheduling.

FIG. 4 is a flowchart illustrating the whole schedule reorganization processing. The operations management server that has received a report on a failure of a disk device executes the priority judgment module 105. The priority judgment module 105 deletes, from the schedule data 109, information about the operations that are stored in the schedule data 109 and that are not yet executed (an operation name, start time, execution time, skip setting, limiter setting, a file to be used), and then adds the information to the reschedule data 110 (401). Next, the priority judgement module 105 requests the disk management server 120 to transmit the file-disk cross-reference data 124 (402). The disk management module 123 of the disk management server 120 transmits, to the operations management server, the file-disk cross-reference data 124 for the disk device in which the failure has occurred. By using the priority judgment module 105, the operations management server, which has received the file-disk cross-reference data 124, finds an operation that uses the files stored in the disk device where the failure occurred (403). For example, if a failure occurs in the disk device 125, an operation A, an operation B, and an operation C which use the files a, b, and c stored in the disk device 125 as shown in FIGS. 2 and 3 are identified.

Next, the schedule preprocessing module 104 determines recovery time of the disk device where the failure has occurred, and also adjusts a schedule of each operation which is stored in the reschedule data 110 and does not use the disk device where the failure occurred (404).

Figure 5:
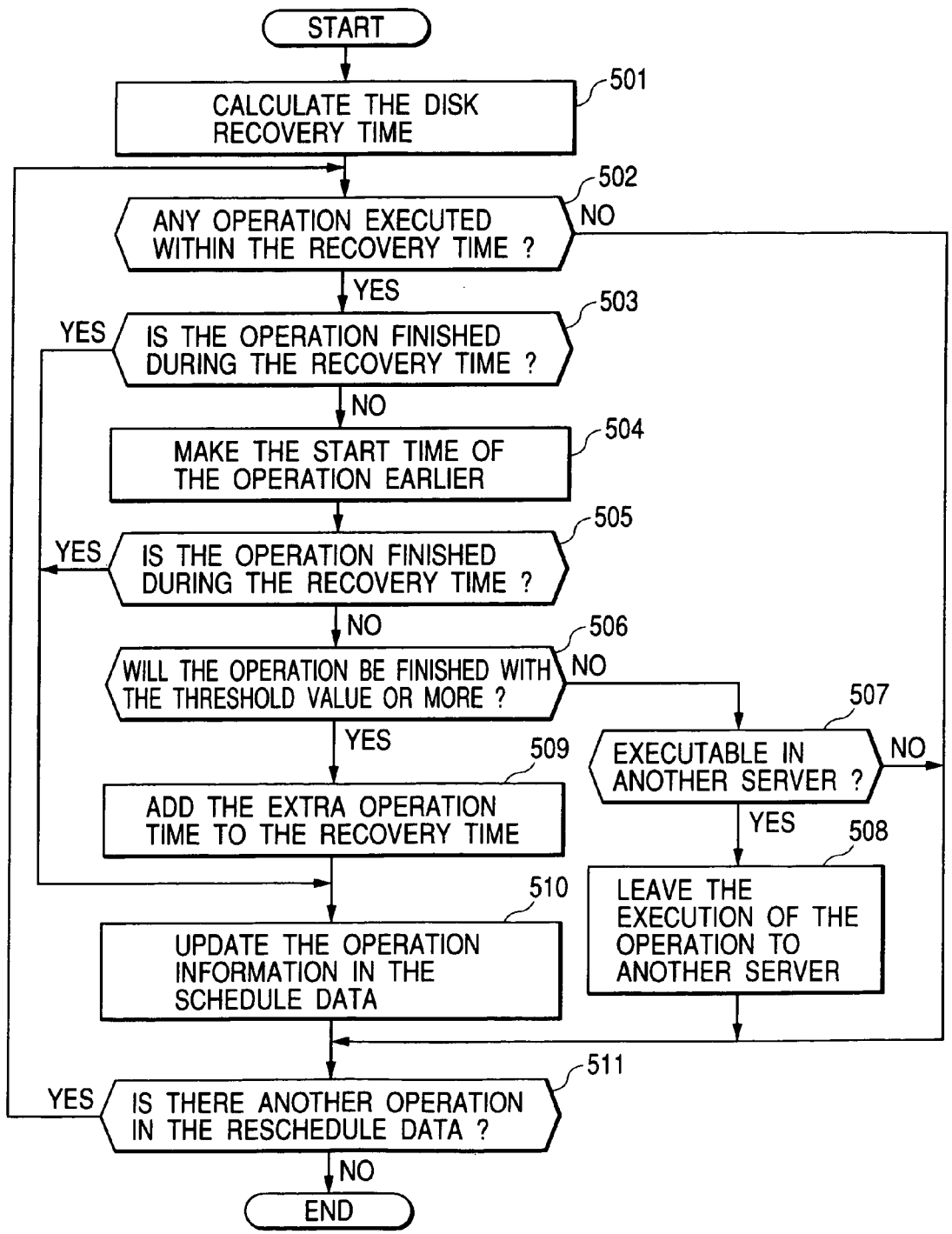
FIG. 5 is a flowchart illustrating processing of scheduling.

FIG. 5 is a flowchart illustrating processing of the schedule preprocessing module 104. To begin with, file information stored in the disk device where the failure occurred is transmitted to the backup server 130. From the transmitted file information, the access management module 133 of the backup server 130 determines the capacity occupied by each file, and then transmits the total capacity corresponding to the files to the operations management server. The schedule preprocessing module 104 uses the transmitted capacity corresponding to the files to determine a period of time required for the recovery of the disk device where the failure has occurred by the following equation (501).

[Recovery time]=[time required to replace volumes]+[capacity]/[transfer rate]

Here, the time required to replace volumes and the transfer rate are predetermined as constants. In this case, the access management module 133 determines the capacity according to the file information. However, if the backup server 130 manages files on a disk device basis, transmitting from the operations management server an identifier for identifying the disk device where the failure has occurred enables determination of the capacity of the files stored in the disk device.

Next, among the operations stored in the reschedule data 110, operations that do not use the disk device where the failure has occurred are found. Then, a judgment is made as to whether or not each of the identified operations is executed during the recovery time determined in the step 501 (502). If there is an operation that is executed during the recovery time ("Yes" in the step 502), a judgment is made as to whether or not the operation can be completed within the recovery time of the disk (the recovery time determined in the above-mentioned equation) (503). If the operation can be completed within the recovery time ("Yes" in the step 503), the operation is added to the schedule data 109, and the operation is deleted from the reschedule data 110 (510) before ending the processing. If the operation cannot be completed within the recovery time ("No" in the step 503), the start time of the operation is made earlier (504).

After the start time of the operation is made earlier, whether or not the operation can be completed within the recovery time is judged (505). If the operation can be completed within the recovery time ("Yes" in the step 505), operation information, the start time of which has been changed, is added to the schedule data 109, and then the operation information is deleted from the reschedule data 110 (510) before ending the processing. In this connection, if the operation is judged to be "No" in the step 503, even if the start time of the operation cannot be made earlier because of tight schedules of operations stored in the schedule data 109, the judgment in the step 505 is made before proceeding to the next step.

If the operation cannot be completed within the recovery time ("No" in the step 505), a judgment is made as to whether or not the operation can be completed with a given threshold value or more at the end of the recovery time (506). The threshold value is predetermined. Here, the explanation is made on the assumption that the threshold value is 80%. The required time for the execution of the operation is known from the execution time of the reschedule data 110. Therefore, if the start time of the operation is determined, it is possible to know how much the operation would have been completed at the end of the recovery time. In the step 506, a judgment is made as to whether or not 80% of the operation ends at the end of the recovery time. If the operation does not end with the threshold value or more ("No" in the step 506), whether or not another operations management server can execute the operation is judged (507). To be more specific, an operation name, start time and the execution time of the operation, and limiter setting are transmitted to another operations management server, whereas another operations management server gives a report on whether or not the operation can be executed. If another management server reports that the operation can be executed ("Yes" in the step 507), another operations management server, which has given the report, is requested to execute the operation (508) At this time, the operation stored as the reschedule data 110 is deleted. In this case, the execution of the operation by another operations management server requires a job for executing the operation to be stored in another operations management server beforehand. However, if another operations management server does not have the job, the job required for executing the operation is transmitted to another operations management server when the execution of the operation is requested. If another operations management server cannot execute the operation ("No" in the step 507), the processing ends.

If the processing of the operation can end with the threshold value or more ("Yes" in the step 506), the end time of the operation is defined as new recovery time (509), and the operation information is added to the schedule data 109 (510), and then the operation information is deleted from the reschedule data 110. It should be noted that if the start time is already changed at this time, the changed start time is stored in the schedule data 109. If another operation is stored in the reschedule data 110 ("Yes" in the step 511), the processing is performed again from the step 502. The job execution control module 103 executes jobs according to the schedule data 109, and executes the operations that have been stored in the schedule data 109 in the step 510 in FIG. 5.

As soon as the schedule preprocessing module 104 completes the adjustment of the schedule, the priority judgment module 105 performs the processing in FIG. 4 again.

The priority judgment module 105 determines schedules of operations stored in the reschedule data 110 (405). Here, the operations stored in the reschedule data 110 are the operations which are executed after a failure occurs, except for the operations that end within the recovery time.

Figure 6:
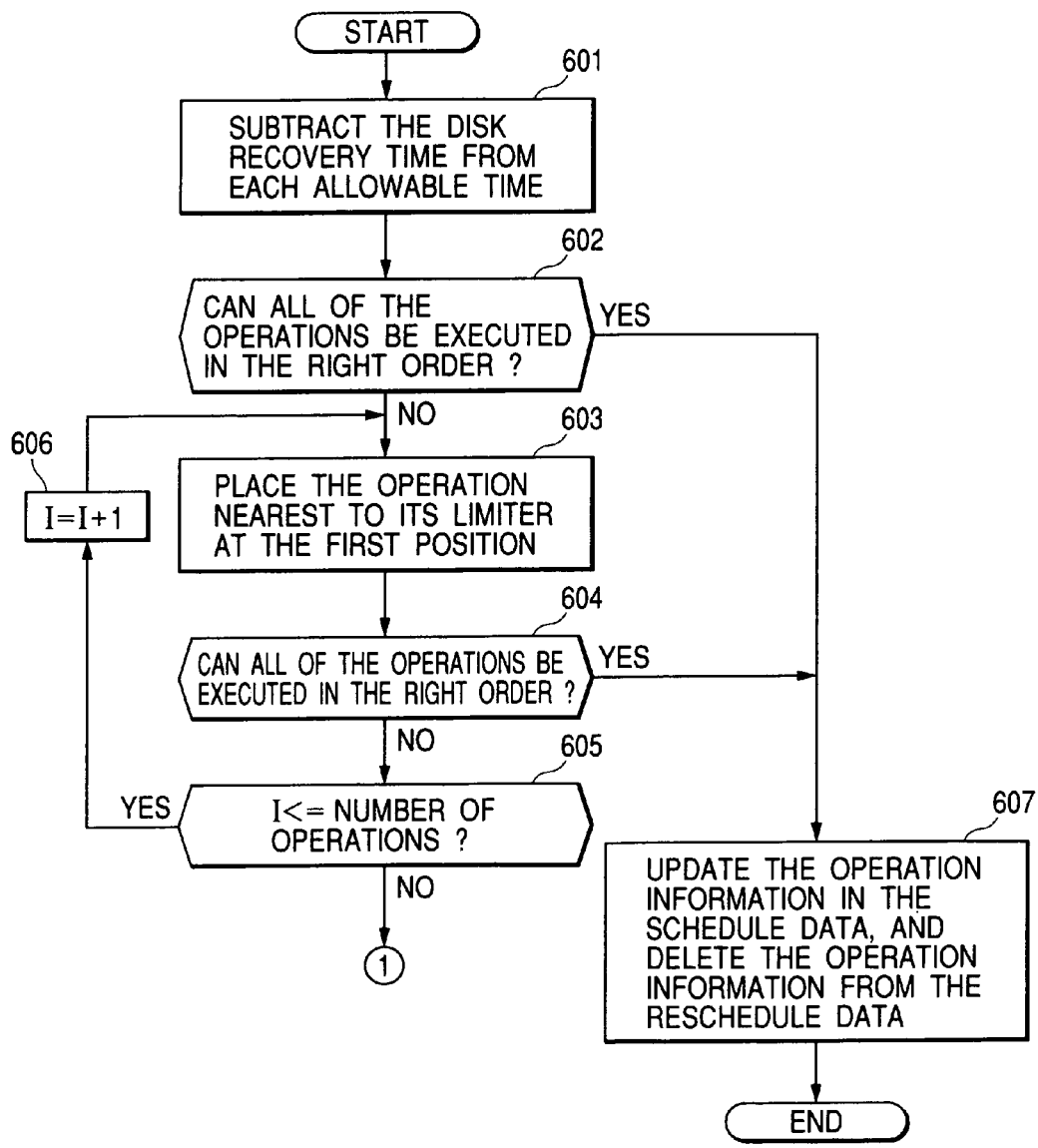
FIG. 6 is a flowchart illustrating processing of scheduling.
Figure 7:
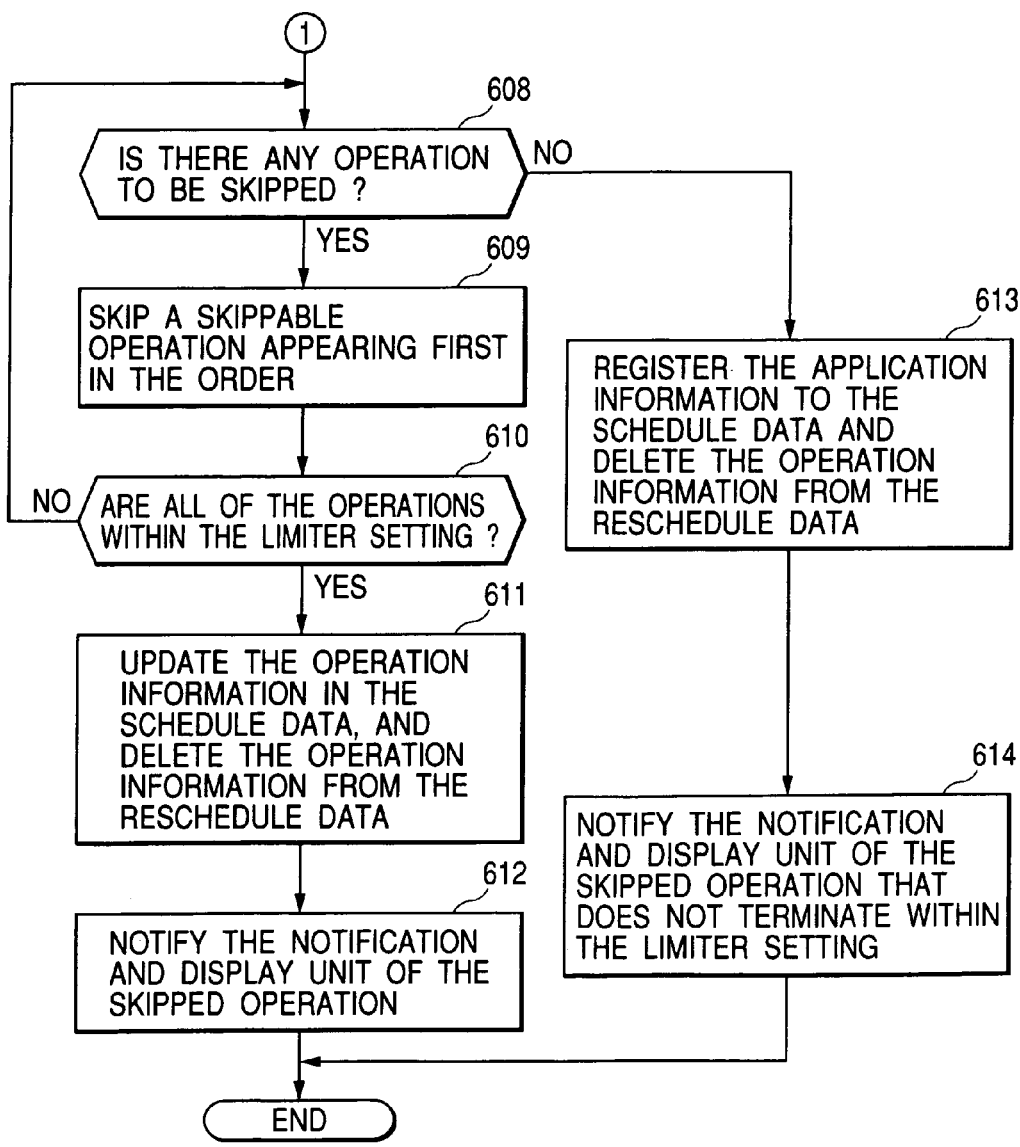
FIG. 7 is a flowchart illustrating processing of scheduling.

FIG. 6 and FIG. 7 are flowcharts illustrating the schedule determination processing of the step 405. To begin with, in order to execute operations after the recovery of the disk device, the priority judgement module 105 subtracts the recovery time from the limiter time of each operation (601). Next, the operations stored in the reschedule data 110 are reorganized in order of increasing start time, and then a judgment is made as to whether or not all operations can be executed without any problem (602). The execution of all operations without any problem means that all operations can be completed without exceeding each limiter setting. If all operations can be executed without any problem ("Yes" in the step 602), the priority judgement module 105 adds the operation information to the schedule data 109 in this order, and deletes the operation information from the reschedule data (607) before ending the processing.

In the case where the operations are executed in this order, if there is an operation that exceeds its limiter setting ("No" in the step 602), the operation order is changed so that an operation the end of which is closest to the limiter setting becomes a first operation (603).

A judgment is made as to whether or not all of the operations can be executed without exceeding each limiter setting in the changed operation order (604). If all of the operations do not exceed each limiter setting ("Yes" in the step 604), the priority judgement module 105 sets the start time of each operation in the changed operation order, stores the operation information in the schedule data 109, and deletes the operation information from the reschedule data 110 (607) before ending the processing.

In the case where there is an operation that exceeds its limiter setting even if the order is changed ("No" in the step 604), the total number of the operations is compared with the number of operations handled with the limiters (605). If there is any operation which has not been changed yet with its order ("Yes" in the step 605), the same processing is performed on an operation having a second closest position to the limiter.

If there is no operation which can be changed with its order ("No" in the step 605), a judgment is made as to whether or not there is an operation that can be skipped (608).

If there is a skippable operation ("Yes" in the step 608), a skippable operation appearing first in the order is deleted from the reschedule data 110 (609). It is to be noted that the start time in the reschedule data 110 at this time is set so that the operations are executed in the order determined in FIG. 6. In addition, the skippable operation appearing first in the order refers to an operation, the start time of which is earliest. A judgment is made as to whether or not the operation stored in the reschedule data 110 exceeds its limiter setting as a result of the skip (deletion) (610). If all of the operations do not exceed each limiter setting ("Yes" in the step 610), the priority judgement module 105 adds operation information stored in the reschedule data 110 to the schedule data 109, and deletes the operation information from the reschedule data (611). Next, a notification and display unit is notified of the skipped operation (612). If there is an operation that exceeds its limiter setting ("No" in the step 610), the processing returns to the step 608 where an operation which can be skipped next is determined. If there is no operation to be skipped, operation information which is currently stored in the reschedule data 110 is added to the schedule data 109, and then the operation information is deleted from the reschedule data 110 (613). In addition, the notification and display unit is notified of the operation that does not end within its limiter setting (614). After the processing in FIG. 7 ends, all the operation information stored in the reschedule data 110 has been added to the schedule data 109, and all the operation information stored in the reschedule data 110 has been deleted.

Returning to the processing in FIG. 4 again, when a schedule is fixed, the display and notification module 106 displays the operation schedule after the change on an operation viewer to notify the administrator of the schedule (406). In this case, to help the administrator easily know operations that exceed each limiter setting, for example, the operations are displayed in red, or only operations exceeding each limiter setting are displayed separately from the other operations.

Figure 8:
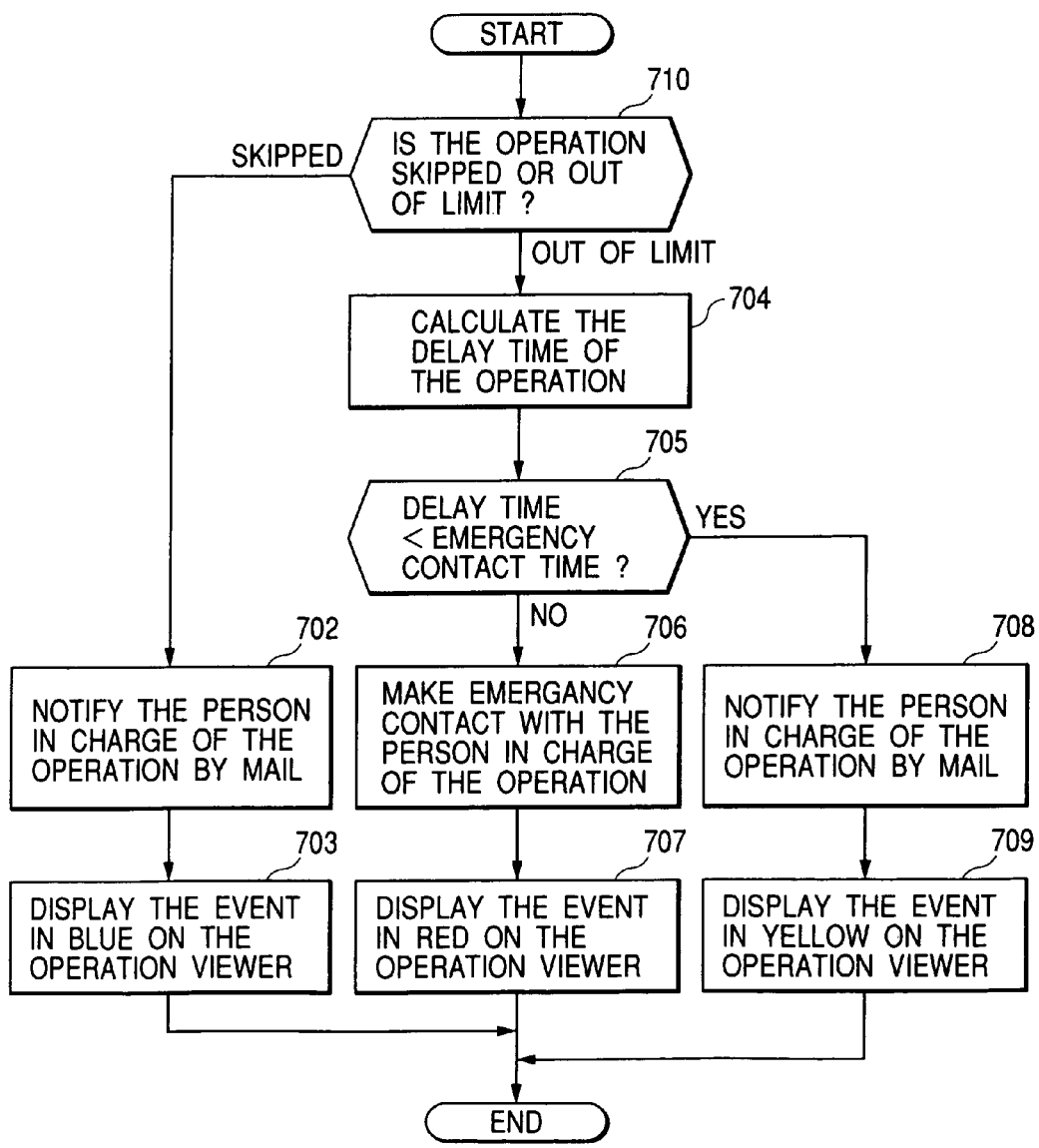
FIG. 8 is a flowchart illustrating display and notification processing.

FIG. 8 is a flowchart illustrating processing of the display and notification module 106. In the first place, a judgment is made as to whether the notified operation is a skipped operation or an operation that has not been completed within the limits of the limiter (701). If it is the skipped operation, a person in charge of the operation is notified of the skipped operation by electronic mail (702). The skipped operation is displayed in blue on the operation viewer (703). As for the operations that do not end within the limits of the limiter setting, the delay time by which the operation is delayed from the limiter is calculated (704). This can be calculated from the limiter setting, the start time, and the execution time, of the schedule data 109. A judgment is made as to whether or not the delay in the operation exceeds emergency contact time (705). The emergency contact time is a value predetermined by the administrator. If the delay in the operation exceeds the emergency contact time, emergency contact is made with the person in charge of the operation by telephone (706). The operations exceeding each limiter setting are displayed in red on the operation viewer (707). If the delay in the operation is within the emergency contact time, the person in charge of the operation is notified of the operations by electronic mail (708). The operations which do not end within the limits of the limiter setting are displayed in yellow on the operation viewer (709).

Figure 9:
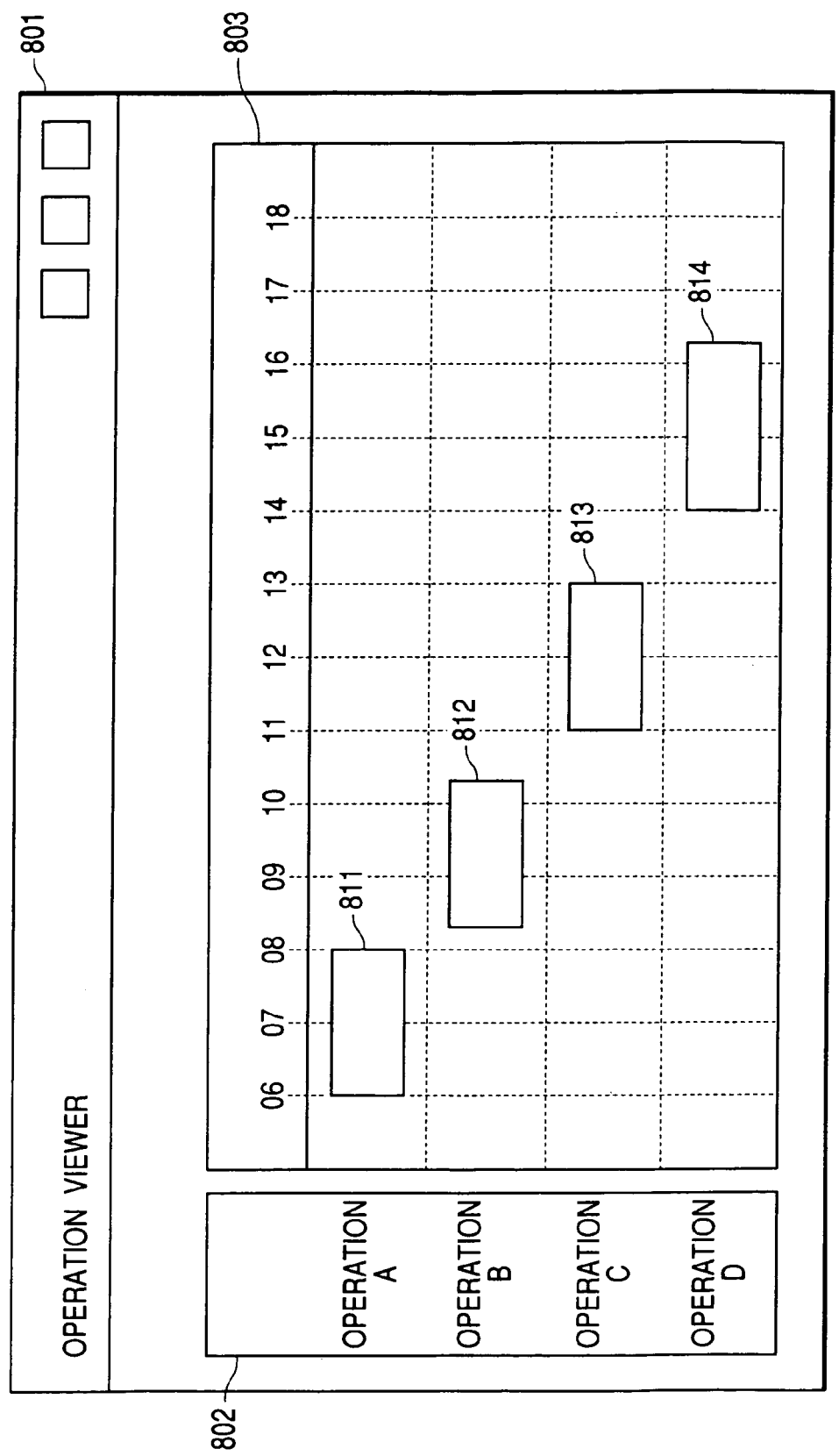
FIG. 9 is a diagram illustrating an example of how an organized schedule is displayed.

FIG. 9 illustrates an example how the operation viewer displays operations.

The operation viewer 801 displays an operation name 802 indicating a managed operation, and a job execution schedule 803. Nodes 811 through 814 of the job execution schedule are discriminated using colors according to the urgency. Default is displayed in green; a node that is of high urgency is displayed in red; a node that is of low urgency is displayed in yellow; and a node which has skipped an operation is displayed in blue.

Returning to the processing in FIG. 4 again, the data transmission module 107 is executed in order to perform the recovery of the disk device where the failure has occurred (407). The data transmission module 107 restores data from the backup server 130 to the disk device where the failure has occurred.

Figure 10:
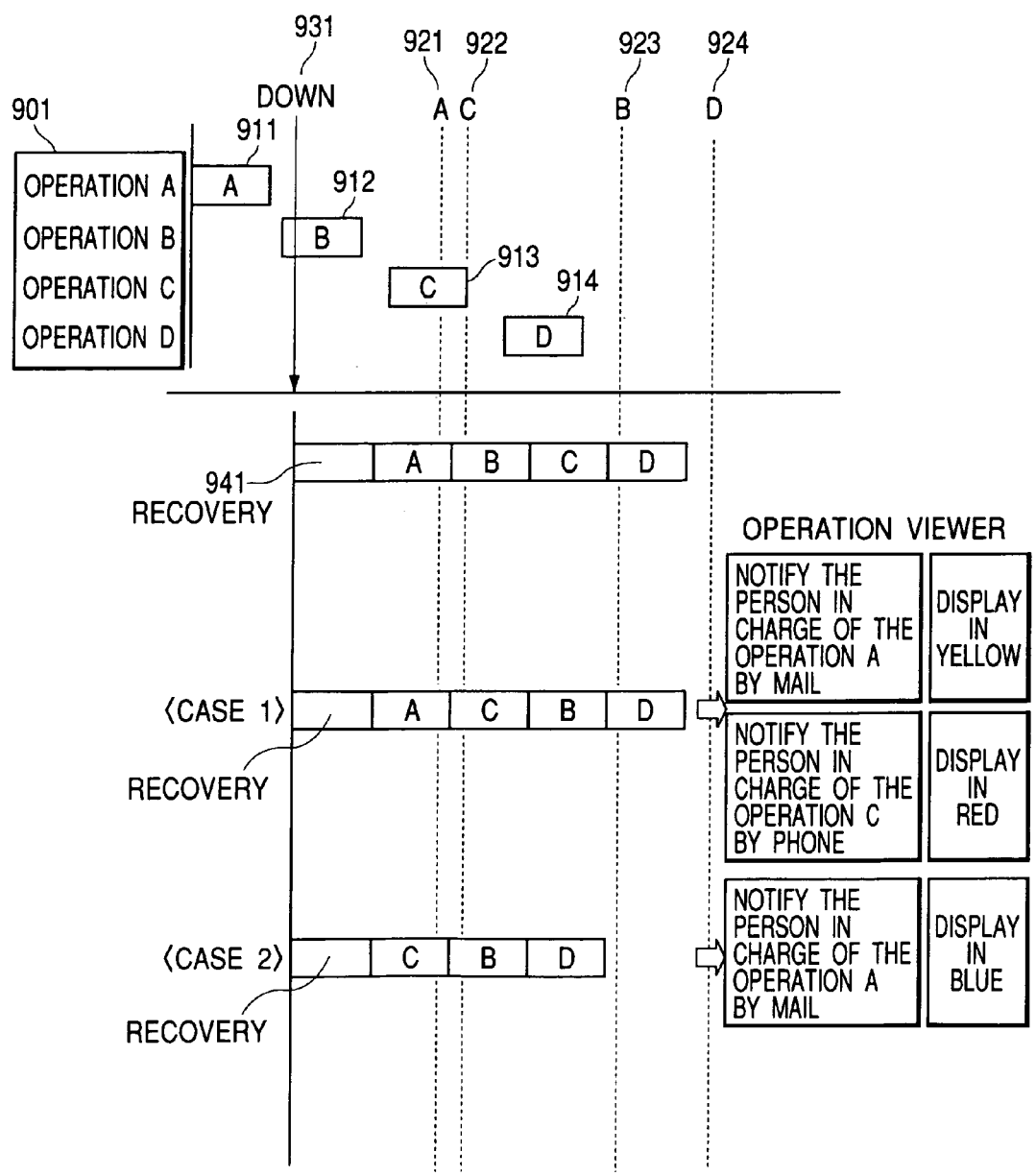
FIG. 10 is a diagram illustrating a specific example of processing.

FIG. 10 is a diagram specifically illustrating how a schedule is changed due to the occurrence of the failure, and how the administrator is notified of the change. Reference numeral 901 denotes operations that are scheduled to be executed. Each of reference numerals 911 through 914 denotes a node of each operation. Each of reference numerals 921 through 924 denotes limiter setting of each operation. If a failure does not occur, the operations are executed in a manner shown by the nodes 911 through 914. "Down" indicated by reference numeral 931 shows a point of time when the failure has occurred in the disk. In this connection, the schedule data 109 at this time is illustrated in FIG. 12(a).

If a failure occurs in the disk device 125, it is judged from the file-disk cross-reference data 124 that operations which use the disk device 125 are an operation A, an operation B, and an operation C. Reference numeral 941 is the recovery time that is determined from the capacity of data stored in the disk device 125. A case 0 is a schedule of the operations, the order of which is changed according to the start time of the operations.

A case 1 is a schedule of the operations, the order of which is changed by the steps 603 through 606 shown in FIG. 6. More specifically, to take the schedule of the case 0 as an example, an operation, the end time of which is farthest from its limiter setting (in this case, the operation C), is treated as an operation to be executed first among operations, the end time of which exceeds its limiter setting (in this case, the operations A and C). Here, the order becomes the operation C, the operation A, the operation B, the operation D. According to the schedule, the order of which has been changed, an operation, the end time of which is farthest from its limiter setting, is treated again as an operation to be executed first among operations, the end time of which exceeds the limiter setting. As a result, as shown in the case 1, the order is changed to the operation A, the operation C, the operation B, the operation D.

Even if the order is changed, there are operations that exceed each limiter setting. Therefore, the processing shown in FIG. 7 is then performed. However, as shown in FIG. 12(a) there is no operation, the skip setting of which is "Yes". Because of it, nothing is performed before the processing ends. As a result, the display and notification module 106 handles the operations exceeding each limiter setting in the following manner.

The display and notification module 106 notifies a person in charge of the operations A and C. How to notify the person in charge of the operations A and C depends on a time difference between the limiter setting and the end time. In the case of the operation A, the time difference from the limiter setting of which is within the range of the emergency contact time, the person in charge of the operation A is notified by electronic mail while the operation A is displayed in yellow on the operation viewer. In the case of the operation C, the time difference from the limiter setting of which exceeds the range of the emergency contact time, the person in charge of the operation C is notified by telephone while the operation C is displayed in red on the operation viewer. After the recovery of the disk, jobs are executed according to the schedule data 109. If necessary, the person in charge changes the schedule data 109. As shown in FIG. 12(b), the case 2 relates to a schedule made when there is a skipped operation. Here, because FIG. 12(b) indicates that the skip setting of the operation A is "Yes", the operation A is deleted from the schedule. In this case, the display and notification module 106 displays a rescheduled operation schedule on the operation viewer. In addition, while the operation A is displayed in blue on the operation viewer, the person in charge of the operation A is notified by electronic mail that the operation A has been skipped.

Figure 11:
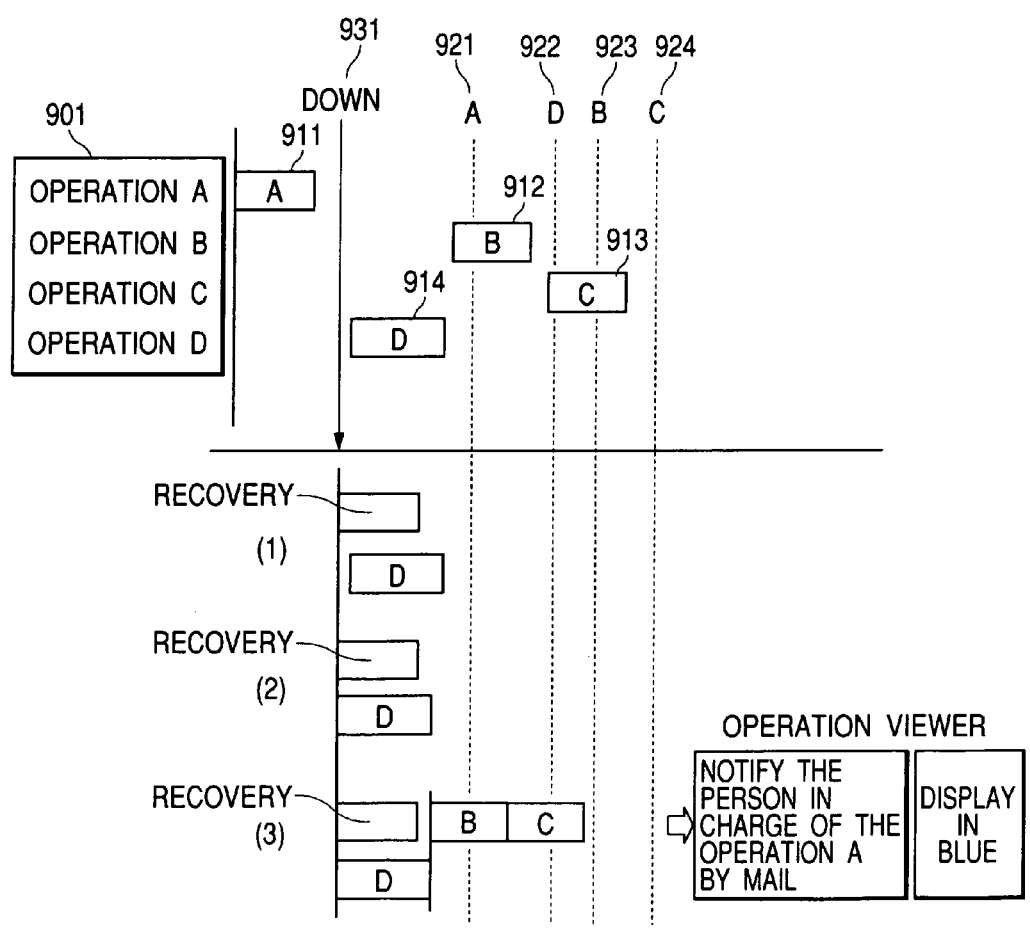
FIG. 11 is a diagram illustrating a specific example of processing.

FIG. 11 illustrates an example of how a schedule is changed if the operation A, the operation D, the operation B, the operation C are scheduled in the schedule data 109 as shown in FIG. 12(c) before a failure occurs. The parts corresponding to those shown in FIG. 10 are identified with the same reference numerals. As is the case with FIG. 10, if a failure occurs in the disk device 125, it is found out that operations which use the disk device 125 are the operation A, the operation B, and the operation C.

Next, by using the processing shown in FIG. 5, a judgment is made as to whether or not there is an operation that does not use the disk 125 where the failure has occurred, and that is scheduled to be executed within the recovery time. Here, the operation D is an operation that does not use the disk device 125 where the failure has occurred, and that is scheduled to be executed within the recovery time.

Because the operation D does not end within the disk recovery time (1), the start time of the operation is made earlier (2). Even if the start time is made earlier, the end time of the operation D exceeds the recovery time. Therefore, the extent to which the operation is completed at the end of the recovery time is calculated. If the extent to which the operation is completed exceeds a predetermined threshold value (for example, 80%), the operation D is executed. Then, treating the end time of the operation D as an end point of the recovery time, the processing shown in FIG. 6 and FIG. 7 is performed on operations which use the disk device 125 where the failure occurred (in this case, the operation A, the operation B, and the operation C). This results in a schedule, the order of which is the operation D, the operation B, the operation C (3). It is to be noted that the operation A is deleted from the schedule because of its skip setting.

Lastly, while displaying the operation A in blue on the operation viewer, the display and notification module 106 notifies the person in charge of the operation A by electronic mail that the operation A is skipped.

In this connection, the data stored in the schedule data 109 is changed when a failure occurs. However, if the schedule data is determined, for example, on a daily basis, the schedule data 109 before the change is used for the next day.

Moreover, according to the above-mentioned embodiment, if a failure occurs, the processing in FIGS. 4 through 8 is applied to all operations that are to be executed after the occurrence of the failure. However, if a time interval between the end time of an operation and the start time of the next operation is longer than the recovery time, it is not necessary to perform the processing in FIGS. 4 through 8 for operations after the recovery time. For example, on the assumption that there are the operation A, the operation B, the operation C, the operation D, and the operation E, if a time interval between the end time of the operation C and the start time of the operation D is longer than the recovery time, the operation D and the operation E may also be excluded from targets of the processing in FIGS. 4 through 8. In order to realize this, for example, the recovery time is determined in the step 501 in FIG. 5, and then a time interval from the end time of an operation to the start time of the next operation is determined. If the time interval is longer than the recovery time, operation information after the recovery is added to the schedule data 109, and such operation information is deleted from the reschedule data.

Thus, it is not necessary for the administrator to find the operations that present problems caused by the failure. In addition, schedules of operations can be automatically reorganized. Even if it is not possible to schedule operations, the operations having problems, and its urgency, are displayed on a screen. Therefore, the administrator can find the problematic operations early and change the schedules of the operations.

As described above, schedules of operations can be reorganized so that it is possible to cope with a disk failure.

What is claimed is:

1. An operations processing system comprising:
a server for executing operations according to a schedule;
a first storage device for storing data processed by said server; and
a second storage device for storing data stored in said first storage device,
wherein said server finds operations that should be executed after a failure is recovered based on failure information of said first storage device, calculates an end time at which restoration of data from said second storage device to said first storage device ends, and according to the calculated end time, produces a schedule that enables said operations found to end within a predetermined time.

2. An operations management method for managing, according to a schedule, operations that involve writing or reading data to or from a first storage device, said operations management method comprising the steps of:
identifying operations that should be executed after a failure is recovered, based on failure information of the first storage device where data is written or read;
calculating an end time at which restoration of data from a second storage device, which stores data stored in the first storage device, to said storage device ends; and
according to the calculated end time, producing a schedule that enables said operations identified to end within a predetermined time.

3. An operations processing method according to claim 2, further comprising the steps of:
producing a schedule that enables at least an operation with a high priority to end within the predetermined time if said operations identified do not end within the predetermined time.

4. A program stored on a computer-readable medium for managing, according to a schedule, operations that involve writing or reading data to or from a first storage device, said program when executed causes a computer to perform the steps of:

identifying operations that should be executed after a failure is recovered, based on failure information of the first storage device where data is written or read;

calculating an end time at which restoration of data to said storage device ends; and according to the calculated end time, producing a schedule that enables said operations identified to end within a predetermined time.

5. An operations processing system according to claim 1, wherein said server produces a schedule that enables at least an operation with a high priority to end within the predetermined time if said operations found do not end within the predetermined time.

* * * * *